(12) United States Patent
Cohen et al.

(10) Patent No.: US 7,509,862 B2
(45) Date of Patent: Mar. 31, 2009

(54) SYSTEM AND METHOD FOR PROVIDING VIBRATION DETECTION IN TURBOMACHINERY

(75) Inventors: Eric D. Cohen, Cambridge, MA (US); James D. Paduano, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/657,216

(22) Filed: Jan. 24, 2007

(65) Prior Publication Data

US 2008/0177485 A1    Jul. 24, 2008

(51) Int. Cl.
    *G01H 11/00*    (2006.01)
(52) U.S. Cl. ...................................................... 73/660
(58) Field of Classification Search ................ 73/593, 73/583, 659–660; 702/183, 115
    See application file for complete search history.

(56) References Cited

U.S. PATENT DOCUMENTS

| | | | |
|---|---|---|---|
| 3,467,358 A | | 9/1969 | Zablotsky et al. |
| 4,426,641 A | * | 1/1984 | Kurihara et al. ............. 340/683 |
| 4,481,819 A | * | 11/1984 | Yoneyama et al. ............ 73/593 |
| 4,573,358 A | | 3/1986 | Luongo |
| 4,683,542 A | | 7/1987 | Taniguti |
| 4,887,468 A | | 12/1989 | McKendree et al. |
| 4,896,537 A | | 1/1990 | Osborne |
| 4,955,269 A | | 9/1990 | Kendig et al. |
| 5,097,711 A | | 3/1992 | Rozelle et al. |
| 5,206,816 A | | 4/1993 | Hill et al. |
| 5,471,880 A | | 12/1995 | Lang et al. |
| 5,479,826 A | | 1/1996 | Twerdochlib et al. |
| 5,686,669 A | | 11/1997 | Hernandez et al. |
| 6,010,303 A | | 1/2000 | Feulner |

(Continued)

OTHER PUBLICATIONS

Carrington, et al., A comparison of blade tip timing data analysis methods, Proc Instn Mech Engrs, 2001, 301-312, vol. 215, Part G.

(Continued)

*Primary Examiner*—Helen C. Kwok
(74) *Attorney, Agent, or Firm*—Peter A. Nieves, Esq.; Sheehan Phinney Bass & Green, P.A.

(57) ABSTRACT

A system and method for providing blade vibration analysis of a turbine is provided. Generally, the system contains a non-contacting sensor capable of determining a distance or velocity of a blade, of the series of blades, in relationship to the sensor. The system also contains a tachometer capable of determining a speed of a shaft of the turbine, and a computer comprising a memory and a processor. The processor is configured by the memory to perform the steps of: processing calibration data of the turbine resulting in a processed calibration signal; processing actual condition data of the turbine, resulting in a processed actual condition signal; calculating a time dilation ratio between a calibration data tachometer window and an actual condition data tachometer window; time dilating either a calibration sensor signal or an actual condition sensor signal using the time dilation ratio, resulting in a time dilated sensor signal; rewindowing the time dilated sensor signal around a zero-crossing point of the time dilated sensor signal, resulting in a derived calibration or actual condition sensor signal; and subtracting the derived calibration or actual condition sensor signal from the processed calibration or actual condition sensor signal.

18 Claims, 10 Drawing Sheets

U.S. PATENT DOCUMENTS

| | | |
|---|---|---|
| 6,094,989 A | 8/2000 | Twerdochlib |
| 6,584,849 B2 | 7/2003 | Loftus et al. |
| 6,594,619 B1 | 7/2003 | von Flotow |
| 6,668,651 B2 | 12/2003 | Beausseroy et al. |
| 6,785,635 B2 | 8/2004 | von Flotow |
| 7,065,471 B2 * | 6/2006 | Gotoh et al. ............... 702/183 |

OTHER PUBLICATIONS

Von Flotow, et al., Health Monitoring and Prognostics of Blades and Disks with Blade Tip Sensors, Aerospace Conference Proceedings, IEEE, Mar. 18-25, 2000, 433-440, vol. 6.

* cited by examiner

SYSTEM AND METHOD FOR PROVIDING VIBRATION DETECTION IN TURBOMACHINERY

FIELD OF THE INVENTION

The present invention is generally related to turbomachinery, and more particularly is related to providing turbine blade vibration analysis.

BACKGROUND OF THE INVENTION

Monitoring and analyzing turbine blade health is a vital ingredient to ensuring proper performance of jet engines. As turbine blades rotate, they tend to vibrate. These vibrations induce stresses in the blades. These stresses can eventually lead to a failure condition known as high-cycle fatigue failure (HCF). This type of failure may initially manifest itself as small cracks. Over time, the crack propagates, and eventually leads to catastrophic failure of the rotating machinery. Real-time knowledge of turbine blade vibration is critical to predicting and preventing such failures.

While HCF failure is perhaps the most insidious failure mode, turbomachinery is also susceptible to more rapid forms of failure. For example, foreign object damage (FOD), where a jet engine ingests debris such as pebbles, has led to a number high profile incidents. Engines can also be damaged by out of balance conditions and accessory failures. These are among the many turbomachinery failure modes that can be detected and possibly prevented through blade vibration monitoring.

Blade tip sensors are typically used to provide continuous monitoring of turbine blades. Blade tip sensors are typically embedded in a jet engine case and used to measure blade tip clearance from walls of the engine, in addition to blade vibration. Recent developments have seen the introduction of multiple non-contacting sensors, such as, but not limited to, eddy current sensor (ECS), into turbomachinery. An ECS employs an active magnetic field to monitor each blade as it passes the sensor. An ECS generates an electrical signal proportional to the distance of a blade from the sensor. Existing algorithms extract two pieces of information from the signature of a non-contacting sensor, signal magnitude and signal zero-crossing time, which are used to estimate vibrational parameters over the course of multiple revolutions. These techniques fail to exploit a majority of the information contained in the non-contacting sensor signal.

One example of current ECS use is in the F-35 Joint Strike Fighter engine. Unfortunately, the eddy current sensors, and other non-contact sensors, are used only to monitor blade tip clearance, which for eddy current sensors is derived by simply taking the maximum value of each ECS pulse. All other data in the ECS pulse are discarded. Most current NSMS (Non-Contact Stress Measurement System) research is primarily focused on a technique known as tip timing. Tip timing systems generally employ special hardware to accurately measure the time at which an ECS pulse passes through zero volts. Since vibrating blades arrive at the sensor at slightly different times, the time of zero crossing is also slightly different, depending on the vibration characteristics. These small timing differences allow blade vibration to be inferred.

Tip timing has a number of deficiencies. It is an inherently aliased approach, since effectively only a single sample per revolution is taken from each blade. Thus, resolving blade vibration often requires multiple sensors. Unfortunately, it is undesirable to have multiple holes within an engine housing for purposes of supporting the eddy current sensors. In addition, tip timing fails to exploit the majority of the data available in an ECS waveform.

Thus, a heretofore unaddressed need exists in the industry to address the aforementioned deficiencies and inadequacies.

SUMMARY OF THE INVENTION

Embodiments of the present invention provide a system and method for providing blade vibration analysis of a turbine. Briefly described, in architecture, one embodiment of the system, among others, can be implemented as follows. The system contains a non-contacting sensor capable of determining a distance or velocity of a blade, of a series of blades, in relationship to the sensor. The system also contains a tachometer capable of determining a speed of a shaft of the turbine, and a computer comprising a memory and a processor. The processor is configured by the memory to perform the steps of: processing calibration data of the turbine resulting in a processed calibration signal; processing actual condition data of the turbine, resulting in a processed actual condition signal; calculating a time dilation ratio between a calibration data tachometer window and an actual condition data tachometer window; time dilating either a calibration sensor signal or an actual condition sensor signal using the time dilation ratio, resulting in a time dilated sensor signal; rewindowing the time dilated sensor signal around a zero-crossing point of the time dilated sensor signal, resulting in a derived calibration or actual condition sensor signal; and subtracting the derived calibration or actual condition sensor signal from the processed calibration or actual condition sensor signal.

The present invention can also be viewed as providing methods for providing blade vibration analysis of a turbine, wherein the turbine contains a series of blades, a rotor, and a shaft. In this regard, one embodiment of such a method, among others, can be broadly summarized by the following steps: processing calibration data of the turbine resulting in a processed calibration signal; processing actual condition data of the turbine, resulting in a processed actual condition signal; calculating a time dilation ratio between a calibration data tachometer window and an actual condition data tachometer window; time dilating either a calibration sensor signal or an actual condition sensor signal using the time dilation ratio, resulting in a time dilated sensor signal; rewindowing the time dilated sensor signal around a zero-crossing point of the time dilated sensor signal, resulting in a derived calibration or actual condition sensor signal; and subtracting the derived calibration or actual condition sensor signal from the processed calibration or actual condition sensor signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present systems and methods provide for vibration detection in turbomachinery using non-contacting sensors. Using a residue generation method, data are compared directly with one another, after accounting for shaft speed differences and noise. The result of the comparison is a residue, which shows the differences between a processed calibration or actual condition sensor signal and a derived calibration or actual condition sensor signal of interest. It should be noted that while the present description provides the example of using an ECS as the non-contacting sensor, other non-contacting sensors may instead be used.

Figure 1:
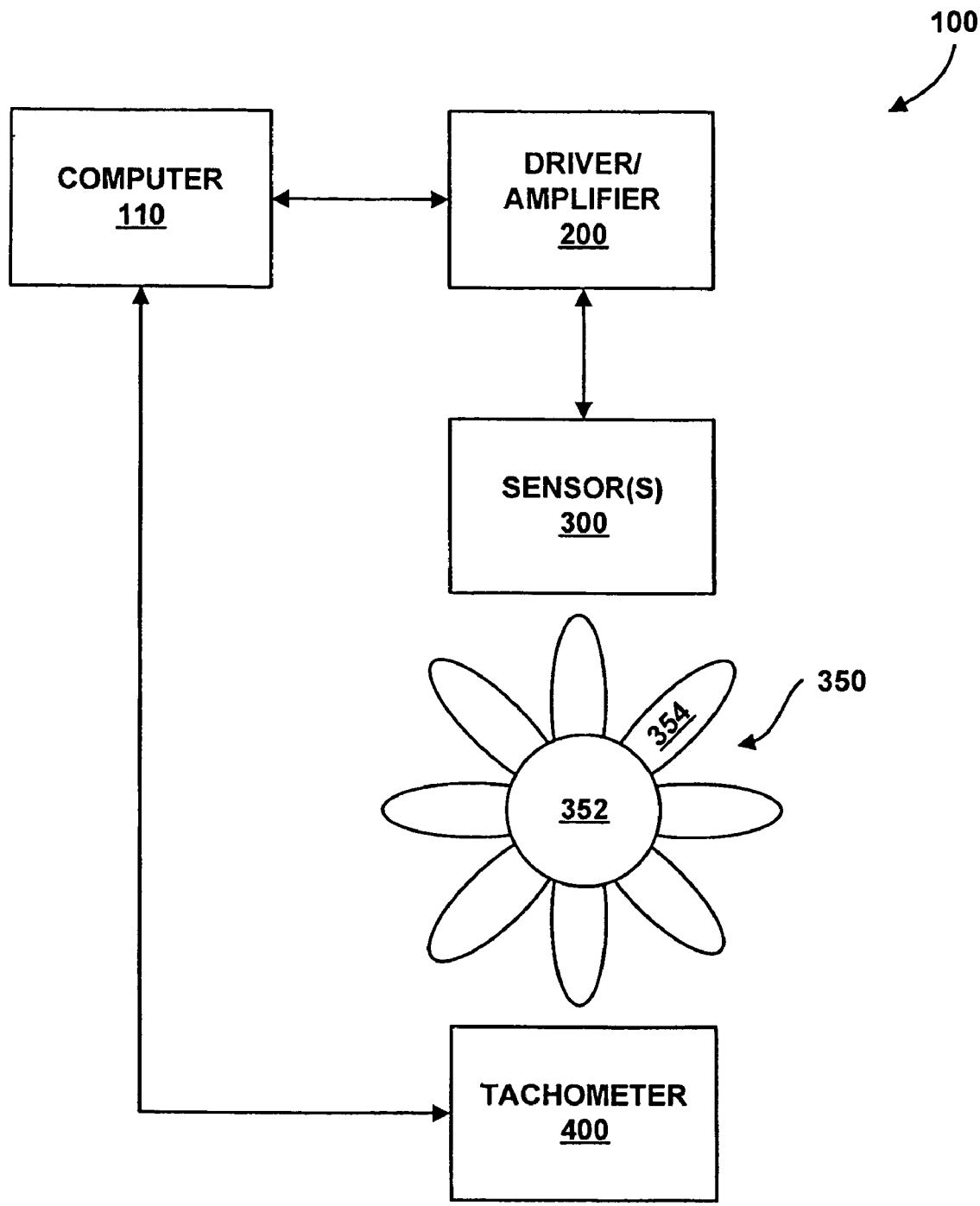
FIG. 1 is a schematic diagram illustrating the present blade vibration detection system.

In accordance with a first exemplary embodiment of the invention, FIG. 1 is a schematic diagram illustrating the present blade vibration detection system 100 (hereafter, "detection system") used to provide residue generation. As shown by FIG. 1, the detection system 100 contains a computer 110 that is used for purposes of determining residue, as is described in detail herein below. Optionally, the computer 110 may be in communication with a driver/amplifier 200, if a driver/amplifier is used. Alternatively, the computer 110 may communicate directly with a non-contacting sensor 300. It should be noted that the functionality provided by the computer 110, as described in detail hereinbelow, may instead be provided on a microchip, such as, but not limited to, a digital signal processor (DSP).

As mentioned above, optionally, a driver/amplifier 200 may be provided, where the driver/amplifier drives the non-contacting sensor 300. The non-contacting sensor 300 is capable of determining a distance or velocity of a blade, of a series of blades, in relationship to the sensor 300. In the example of using an ECS for the non-contacting sensor 300, the driver/amplifier 200, is an oscillator that generates a high frequency alternating signal that drives one coil of the non-contacting sensor 300 to provide an alternating time varying magnetic field. Since drivers/amplifiers are well known to those having ordinary skill in the art, further description of the driver/amplifier 200, is not provided herein. It should be noted that if instead of an ECS, a variable reluctance sensor was used, a driver/amplifier would not be necessary.

As is known by those having ordinary skill in the art, eddy current sensors are active type sensors, containing a coil driven by a high frequency oscillator. This generates a time-varying magnetic field. When the magnetic field encounters a conductor, the magnetic field induces eddy currents within the material of the conductor. The eddy currents, in turn, generate their own magnetic fields, which interact with the sensor coil. These field interactions manifest themselves as changes in the reactance of the sensor coil. A special circuit measures the change in reactance of the coil, and converts it to a voltage that is proportional to the distance of the conductor from the sensor.

It should be noted that, while FIG. 1 illustrates a single ECS 300, more than one ECS 300 might be provided. As an example, there may be an array of eddy current sensors 300 surrounding the turbine 350. As is shown by FIG. 1, the turbine 350 contains a rotor 352 and a series of blades 354. The turbine 350 also contains a shaft, which is not shown. By using multiple eddy current sensors 300 located at different locations, a single blade 354 can be monitored at different locations during a single revolution of the shaft.

A tachometer 400 is also in communication with the computer 110 and is capable of detecting shaft speed by monitoring the shaft. The tachometer 400 reading is used in the present system and method, as further explained hereinbelow, for purposes of at least providing a reference signal, specifically because shaft velocity is not affected by blade activity. Since one having ordinary skill in the art would understand functionality of a tachometer 400, further description is not provided herein.

Measurements for both the ECS 300 and the tachometer 400 are transmitted to the computer for analysis and use in accordance with the present invention. Analysis and use of the ECS 300 and tachometer 400 measurements is described in detail hereinbelow.

Figure 2:
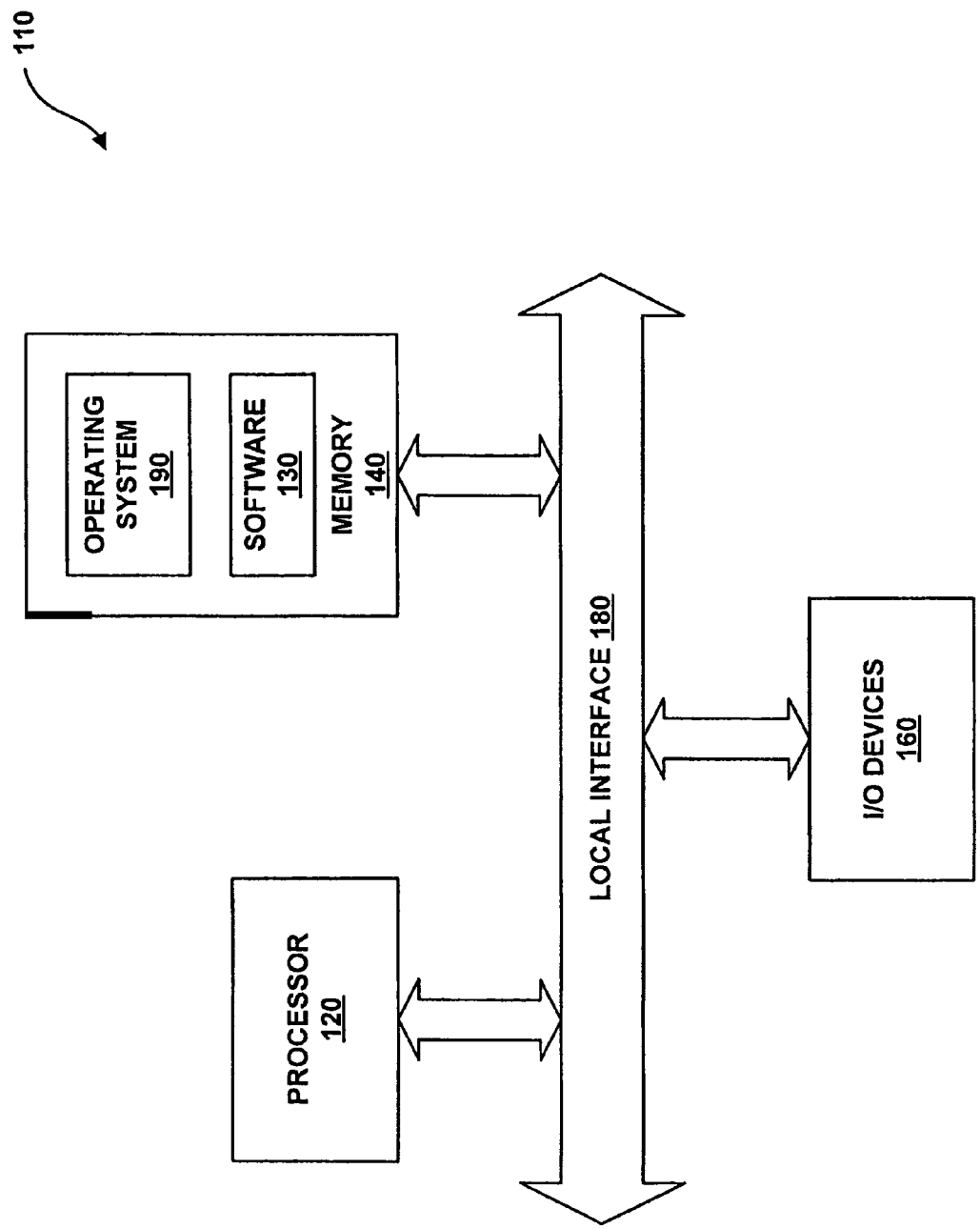
FIG. 2 is a block diagram further illustrating the computer of FIG. 1.

FIG. 2 is a block diagram further illustrating the computer 110 of FIG. 1. Functionality performed by the present system and method can be implemented in software (e.g., firmware), hardware, or a combination thereof. In the currently contemplated best mode, the detection system functionality is defined and implemented by software, as an executable program, and is executed by a special or general purpose digital computer, such as a personal computer (PC; IBM-compatible, Apple-compatible, or otherwise), workstation, mini-computer, or mainframe computer. An example of a general-purpose computer that can implement the present system and method is the computer 110 of FIG. 2.

Generally, in terms of hardware architecture, as shown in FIG. 2, the computer 110 includes a processor 120, a memory 140, and one or more input and/or output (I/O) devices 160 (or peripherals) that are communicatively coupled via a local interface 180. The local interface 180 can be, for example but not limited to, one or more buses or other wired or wireless connections, as is known in the art. The local interface 180 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software 130, particularly that stored in the memory 140. The processor 120 can be any custom made or commercially available processor, a central processing unit (CPU), an auxiliary processor among several processors associated with the computer 110, a semiconductor based microprocessor (in the form of a microchip or chip set), a macroprocessor, or generally any device for executing software instructions.

The memory 140 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 140 may incorporate electronic, magnetic, optical, and/or other types of storage media. Note that the memory 140 can have a distributed architecture, where various components are situated remote from one another, but can be accessed by the processor 120.

The software 130 in memory 140 may include one or more separate programs, each of which comprises an ordered listing of executable instructions for implementing logical functions in accordance with the present invention. Functionality defined by the software 130 is described in detail herein. In the example of FIG. 2, the memory 140 may also contain a suitable operating system (O/S) 190. The operating system 190 essentially controls the execution of other computer programs and provides scheduling, input-output control, file and data management, memory management, and communication control and related services.

The I/O devices 160 may include input devices, for example but not limited to, a keyboard, mouse, scanner, microphone, etc. In addition, a data acquisition card may be an input device of the computer 110. Furthermore, the I/O devices 160 may also include output devices, for example but not limited to, a printer, display, etc. Finally, the I/O devices 160 may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the computer 110 is a personal computer, workstation, or the like, the memory 140 may further include a basic input output system (BIOS) (omitted for simplicity). The BIOS is a set of essential software routines that initialize and test hardware at startup, start the O/S 190, and support the transfer of data among the hardware devices. The BIOS is stored in ROM so that the BIOS can be executed when the computer 110 is activated.

When the computer 110 is in operation, the processor 120 is configured to execute the software 130 stored within the memory 140, to communicate data to and from the memory 140, and to generally control operations of the computer 110 pursuant to the software 130. When the present system and method is implemented in software, as is shown in FIG. 2, it should be noted that the software 130 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

In an alternative embodiment, where the system and method is implemented in hardware, the system and method can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
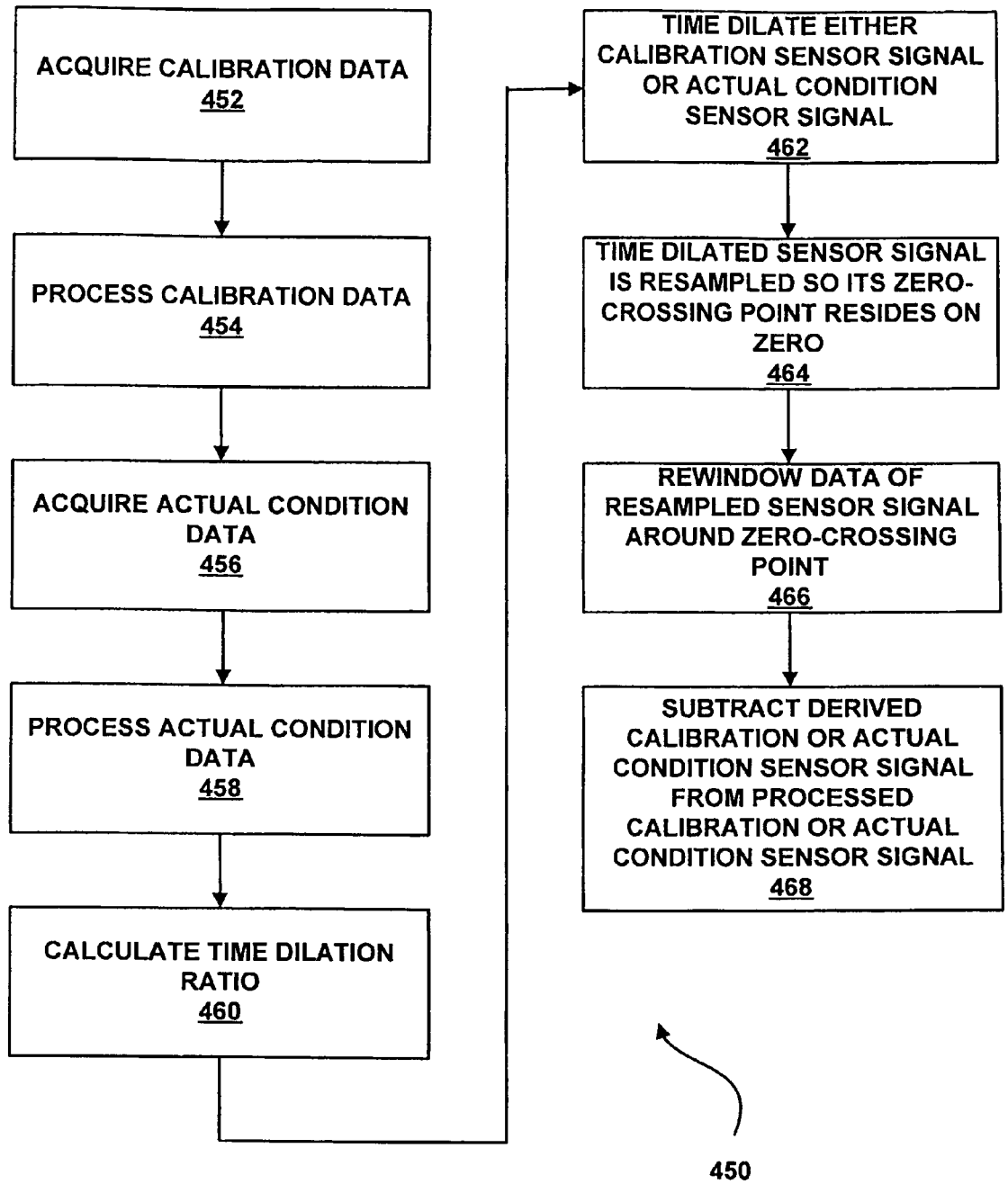
FIG. 3 is a flow chart illustrating a method of determining residue of the turbine of FIG. 1.

FIG. 3 is a flow chart 450 illustrating a method of determining residue of the turbine 350, in accordance with the first exemplary embodiment of the invention. It should be noted that the method is described assuming that the non-contact sensor 300 is an ECS. As mentioned above, other non-contact sensors may instead be used.

As is shown in detail hereinbelow, the residue is the difference between calibration data and data from the turbine in its normal environment (i.e., actual conditions data). It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 452, calibration data of the turbine 350 is acquired, thereby acquiring data under ideal conditions. To obtain calibration data, the turbine 350 to be tested is placed in ideal conditions. As an example, the turbine 350 may be placed in a vacuum under mechanically balanced conditions. While in the vacuum, eddy current data of the turbine 350 is acquired by the ECS 300. In addition, the tachometer 400 is used to obtain tachometer data, such as, but not limited to, shaft speed.

Figure 4:
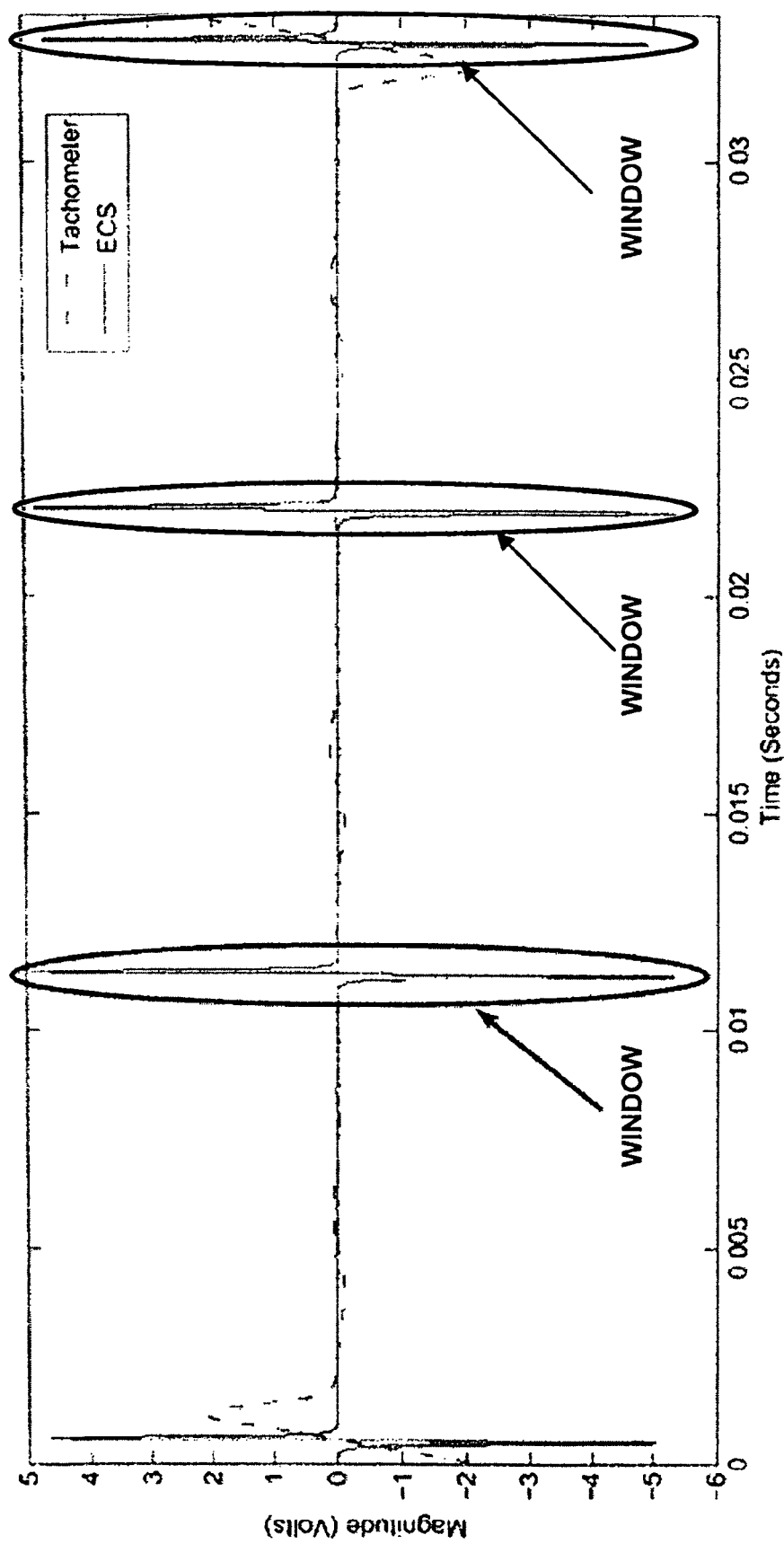
FIG. 4 is a graph providing an example of a plot of eddy current data for one revolution of the shaft, as determined by the tachometer of FIG. 1, under ideal conditions.

FIG. 4 is a graph providing an example of a plot of eddy current data for one revolution of the shaft, as determined by the tachometer 400, under ideal conditions. Specifically, FIG. 4 illustrates a calibration ECS signal and a calibration tachometer signal. The plot of the calibration ECS signal represents blade distance from the ECS 300, for a three-bladed rotor, where a magnitude of zero (0) volts represents a blade 354 being directly adjacent to the ECS 300. As is shown by FIG. 4, there are three secondary windows, one for each blade, within the first window, where each secondary window is a period of time in which the ECS 300 detects a single blade 354 of the turbine 350.

Figure 5:
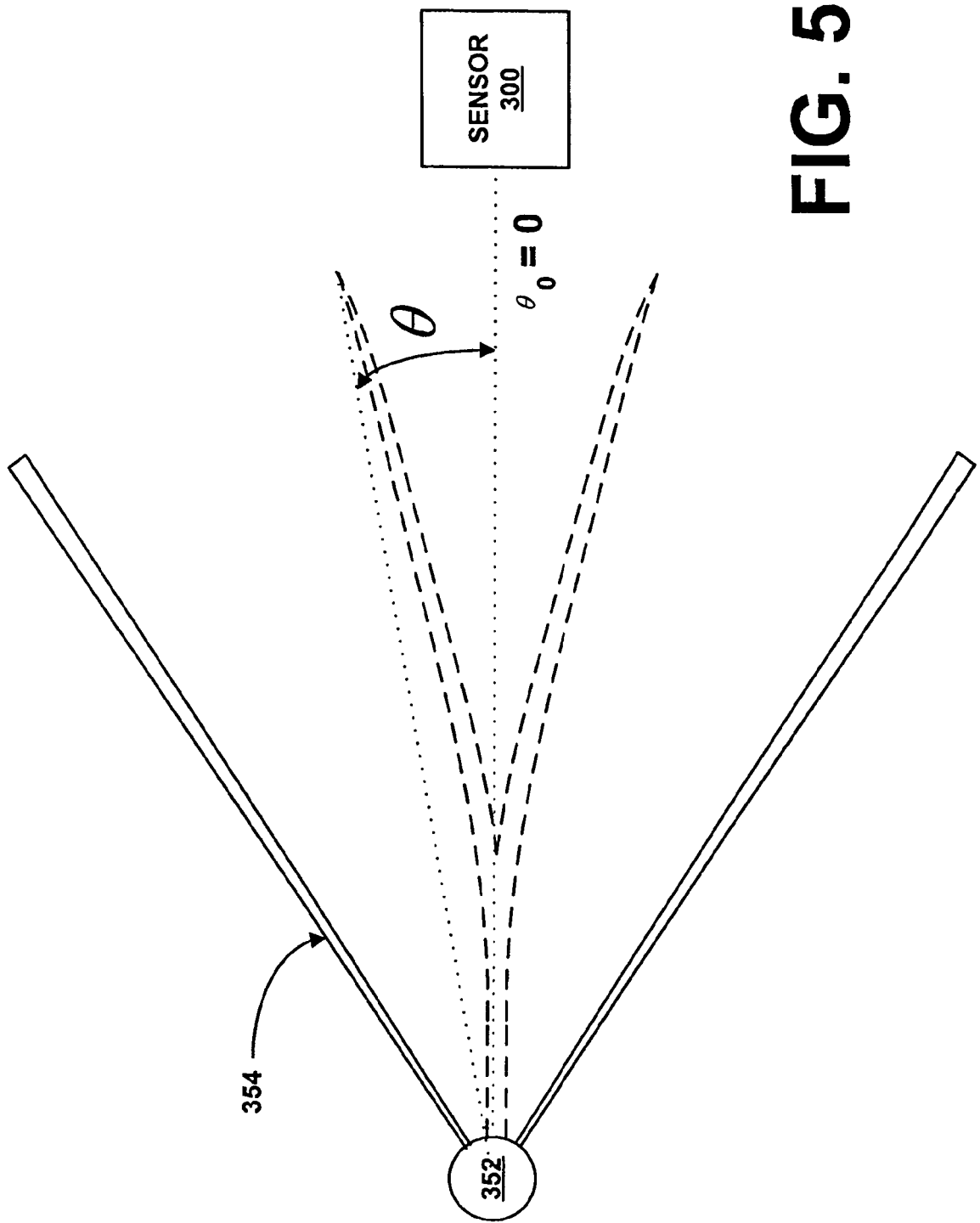
FIG. 5 is a schematic diagram illustrating an example of a rotor, blade, and ECS relationship.

FIG. 5 is a schematic diagram illustrating an example of a rotor 352, blade 354, and ECS 300 relationship. As shown by FIG. 5, when a blade 354 is in the same x-axis as the sensor 300, a blade tip angle to the axis is zero (0). Alternatively, when the blade tip is above or below the x-axis, the blade tip angle has a non-zero value.

Figure 6:
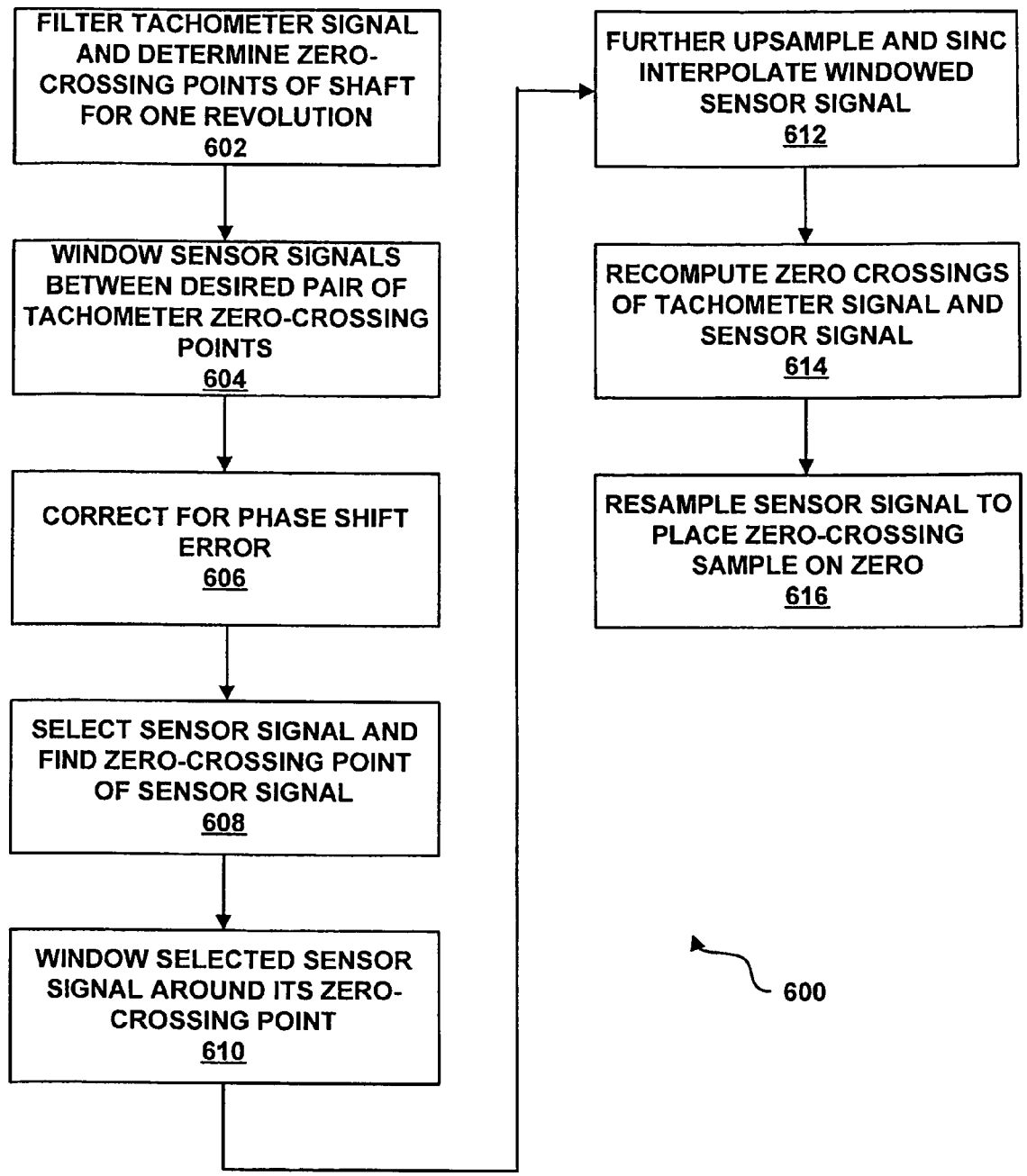
FIG. 6 is a flow chart further illustrating functions performed during processing of calibration data.

Returning to FIG. 3, the calibration data of the turbine 350 is processed (block 454). FIG. 6 is a flow chart further illustrating the functions performed during processing of the calibration data. The result after processing of the calibration data is a calibration data, windowed, and upsampled ECS signal with a known zero-crossing point.

Returning to FIG. 3, the turbine 350 is then used under actual conditions (i.e., in its normal environment) and the abovementioned data is again acquired (block 456). As an example, the turbine 350 may be placed in an engine, after which eddy current data and tachometer data is acquired. The eddy current data and tachometer data acquired during use of the turbine 350 in its normal environment is referred to herein as actual condition data. A graph providing an example of a plot of eddy current data for one revolution of the shaft, under actual conditions, would look similar to FIG. 4

As shown by block 458 of FIG. 3, the actual condition data of the turbine 350 in its normal environment is processed. Functions performed during processing of the actual condition data are the same as the functions performed during processing of the calibration data, as illustrated by FIG. 6, and are mentioned hereinbelow with regard to the description of FIG. 11. The result after processing of the actual condition data is an actual condition data, windowed, and upsampled ECS signal with a known zero-crossing point.

It is necessary to perform vibration detection independent of shaft speed. In particular, we would like to be able to compare calibration data at one speed, with experimental data at a slightly different speed. Unfortunately, attempting a comparison between data collected at different shaft speeds without any transformation yields results that are dominated by shaft speed related artifacts instead of features indicating a vibrating condition. To account for such speed differences, a time dilation method is provided by the present system and method. Specifically, after preparing the calibration data and the actual condition data for analysis, a time dilation ratio between the calibration data tachometer window and the actual condition data tachometer window is calculated (block 460). The ratio is a ratio of the number of samples in the actual condition window divided by the number of samples in the calibration window, which is further explained below.

Time dilation works by resampling data at a sample interval that is adjusted by the ratio of the number of samples, or time, in a single shaft rotation of interest. While different methods may be used to perform the above-mentioned, the following standard linear interpolation is an example of a method that may be used.

$$d_{dil}(n) = d\lfloor \xi(n) \rfloor + (d\lceil \xi(n) \rceil - d\lfloor \xi(n) \rfloor) * (\xi(n) - \lfloor \xi(n) \rfloor) \quad \text{(eq. 1)}$$

where d is the data vector, and $\xi(n)$ is the irrational tile dilation point to interpolate around. Since time dilation is a cumulative operation, the time dilation vector $\zeta(n)$ is used to find $\xi(n)$ as follows:

$$\xi(n) = \sum_{m=1}^{n} \zeta(m) \quad \text{(eq. 2)}$$

and $\zeta(n)$ is the time dilation vector defined as:

$$\zeta(n) = \frac{\rho_c}{\rho_b} \quad \text{(eq. 3)}$$

where $\rho_c$ is the number of samples on the comparison pulse, and $\rho_b$ is the number of sampled in the baseline pulse.

As shown by block 462, using the time dilation ratio, either the calibration ECS signal, or the actual condition ECS signal is time dilated. Performing time dilation on one of the calibration ECS signal and the actual condition ECS signal changes the window of the selected ECS signal to be the same sample length as the window of the ECS signal that was not selected. The result after time dilating either the calibration ECS signal or the actual condition ECS signal is having both the calibration ECS signal window and the actual condition ECS signal window with the same number of data samples, alternatively referred to as variable expansion or compression of the data within the time dilated window.

As shown by block 464 the time dilated ECS signal is then resampled so that its zero-crossing sample resides precisely on zero. Data of the resampled ECS signal is then rewindowed around the zero-crossing point (block 466). Since the process of rewindowing around a zero-crossing point has been described hereinabove, this process is not explained again here. The result after rewindowing is a derived calibration or actual condition ECS signal.

The residue may then be computed by subtracting the derived calibration or actual condition ECS signal from the processed calibration or actual condition ECS signal (block 468), where the processed calibration or actual condition ECS signal is the opposite of the selected calibration or actual condition ECS signal chosen for time dilation. Specifically, if the derived ECS signal is a derived calibration ECS signal, the derived calibration ECS signal is subtracted from the processed actual condition ECS signal. Alternatively, if the derived ECS signal is a derived actual condition ECS signal, the derived actual condition ECS signal is subtracted from the processed calibration ECS signal. Data point by data point subtraction is performed during subtraction, resulting in the residue.

FIG. 6 is a flow chart 600 further illustrating functions performed during processing of the calibration data. As is shown by block 602, the tachometer signal is filtered and the zero-crossing points of the shaft are determined for one revolution of the shaft. The tachometer signal is the reference pulse used to frame data for each revolution of the shaft. A single revolution is defined as the time between zero crossings of two adjacent tachometer signals. A reliable means of finding zero-crossing points is required. By observing that the tachometer signal only crosses zero when its derivative is large, and that by definition there is a sign change at the zero-crossing point, the method for finding the zero-crossing point becomes apparent. The method of finding the zero-crossing points searches the tachometer signal for points of positive derivative and then searches within those points for a sign change across adjacent samples. The first sample before the sign change is returned. For finding the actual zero-crossing points, where actual zero-crossing points are samples whose value is exactly zero, different methods may be used, such as, but not limited to linear interpolation.

Unfortunately, linear interpolation is adversely affected by noise. It should be noted, however, that another method, besides linear interpolation, may be used The tachometer signal may therefore be filtered with a low-pass filter, such as, but not limited to, a FIR Remez filter. The FIR Remez filter is a constant group delay filter, so shifting the filter output by the group delay ensures zero-crossing time remains uncorrupted. The noise is in the upper frequency reaches of the band, so filtering does not adversely affect any other aspect of the data.

As is shown by block 604, ECS signals between a desired pair of tachometer 400 zero-crossing points are windowed. The result of windowing the ECS signals between the desired pair of tachometer 400 zero-crossing points is illustrated by FIG. 4.

Figure 7:
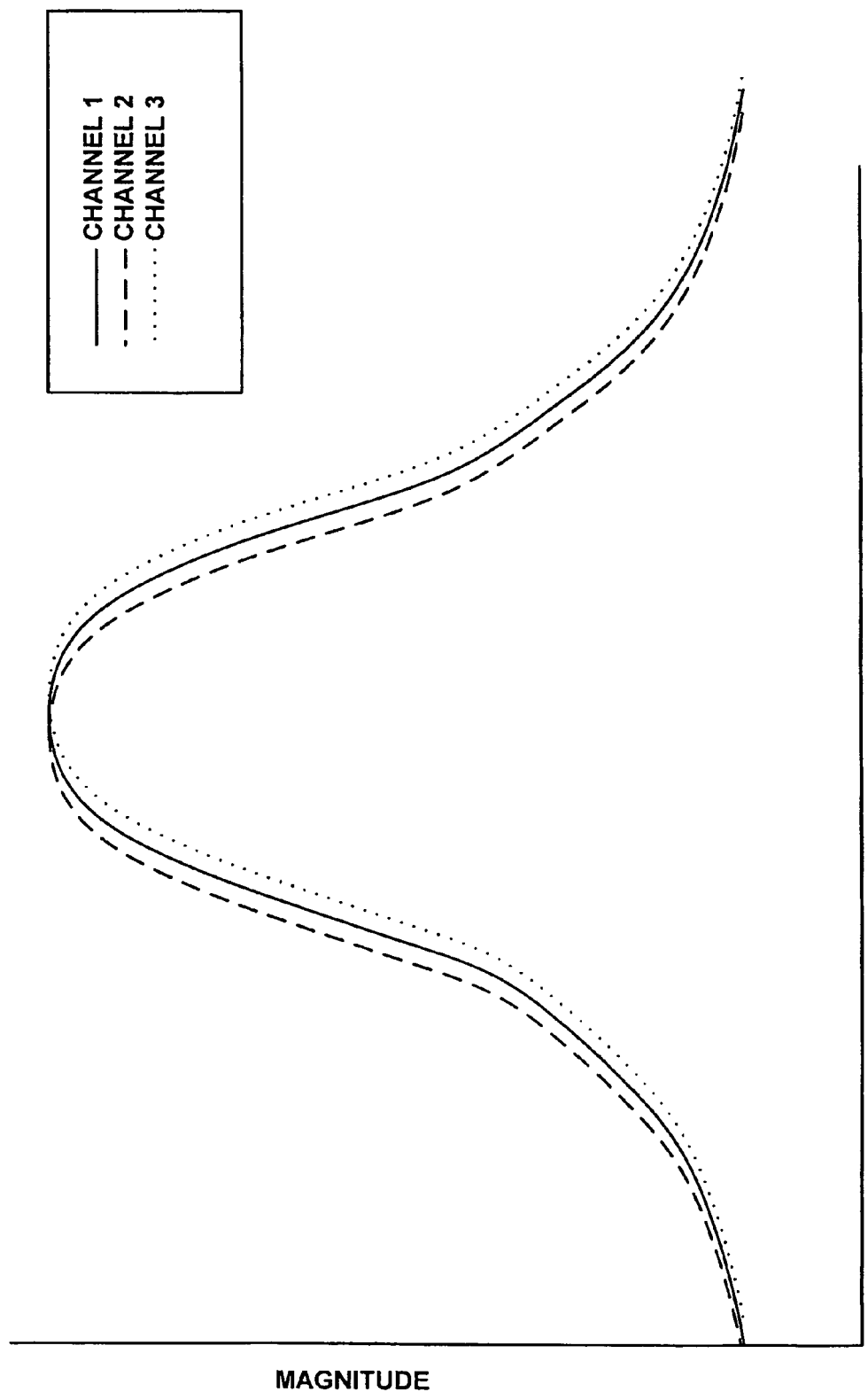
FIG. 7 is a graph further illustrating phase shift by showing the result of sampling the same sign wave from three (3) different data acquisition channels.

If obtaining of the tachometer signal and ECS signal are performed by sampling sequentially, as opposed to simultaneously, a data acquisition phase shift error is incorporated into the tachometer signal and ECS signal samples. To correct for the phase shift error, the ECS signals are subsample shifted (block 606). Specifically, the windowed ECS signals are phase shifted according to a data acquisition channel by a fraction of a sample. The fractional sample shift is achieved by upsampling and sinc interpolating by the number of data acquisition channels, shifting the desired channel by its channel number, and then downsampling by the total number of channels. FIG. 7 is a graph further illustrating the phase shift by showing the result of sampling the same sign wave from three (3) different data acquisition channels.

Figure 8:
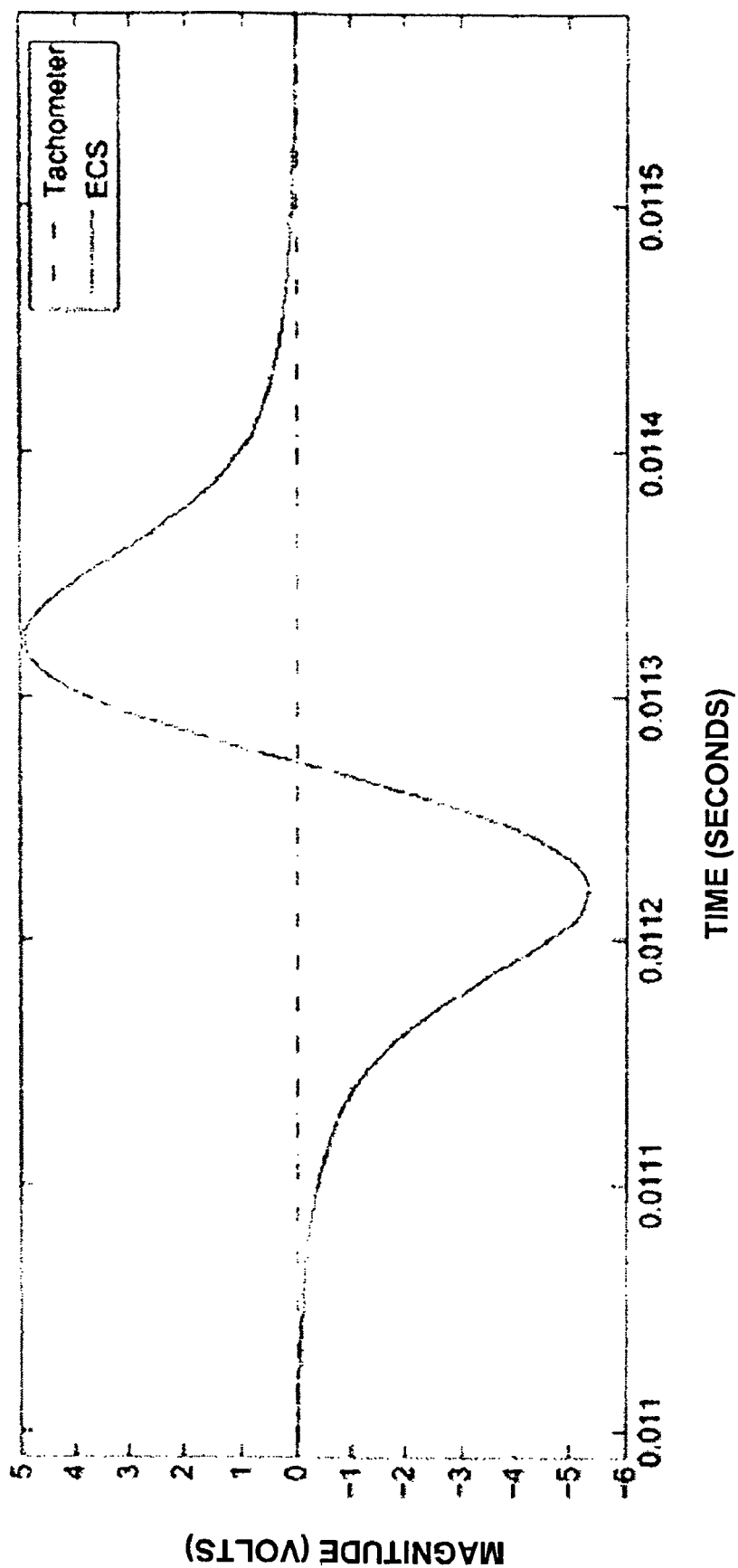
FIG. 8 is a graph illustrating the result of windowing a selected ECS signal.

A specific ECS signal is selected from the ECS signals located between the desired pair of tachometer 400 zero-crossing points, after which a zero-crossing point of the specific ECS signal is determined (block 608). As is shown by block 610 the selected ECS signal is windowed around its zero-crossing point. Specifically, the size of the window used during windowing of the selected eddy current pulse is a factor of a blade operational speed range and geometry of the blades. The result of windowing the selected ECS signal is shown by the graph of FIG. 8.

Figure 9:
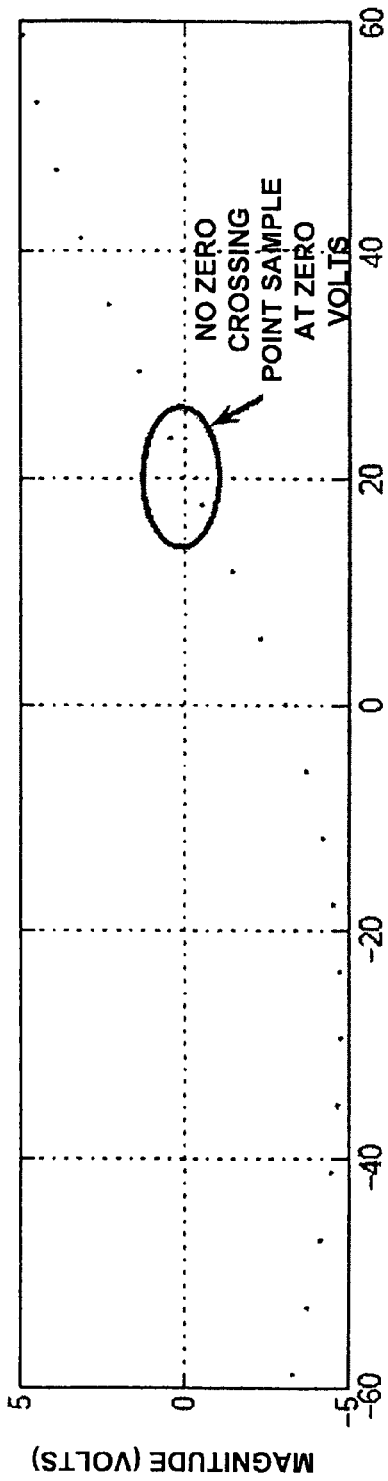
FIG. 9 is a graph showing a window of eddy current data of an ECS signal sampled at 170 KHz.

Although upsampling was performed for the data acquisition phase shift correction (block 606) mentioned above, the upsample factor was only equal to the number of channels in the data set. Interpolation error decreases with higher upsample factors, so a large factor is desired. As an example, FIG. 9 is a graph showing a window of eddy current data of an ECS signal sampled at 170 KHz. As shown by FIG. 9, there is no zero-crossing point sample at zero volts.

Figure 10:
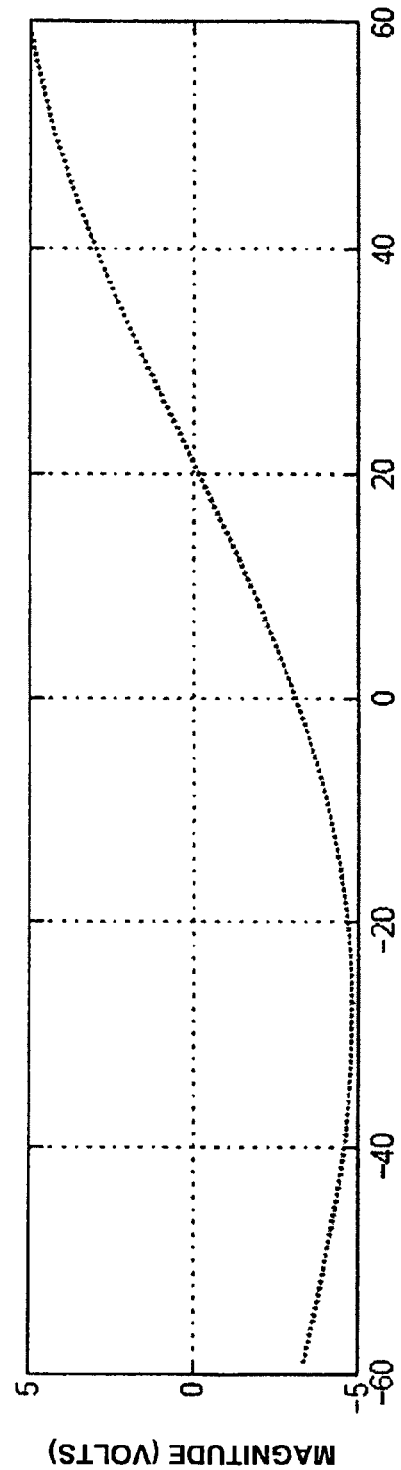
FIG. 10 is a graph showing a window of eddy current data sampled at 1.70 MHz, where the zero-crossing point of the ECS signal is more easily determined.

As is shown by the following steps, to obtain a zero-crossing point sample, a more accurate interpolation (sinc) is used to get close to zero, and then a less accurate but more flexible method (linear) is used to get right to the zero-crossing point. To obtain a zero-crossing point sample, or at least a more accurate measurement of the zero-crossing point, the windowed ECS signal (i.e., data channel) is further upsampled and sinc interpolated (block 612). Sinc interpolation allows for better reconstruction of arbitrarily many samples, subject to memory 140 and processor 120 limitations. As an example FIG. 10 is a graph showing a window of eddy current data sampled at 1.70 MHz, where the zero-crossing point of the ECS signal is more easily determined, using linear interpolation, for example.

After upsampling and sinc interpolating, the zero crossings of the tachometer signal and the ECS signal are recomputed (block 614), since there will necessarily be additional samples between the previously computed zero crossing and the actual zero crossing. It is unlikely that any sample falls exactly on zero. As a result, the ECS signal is resampled (block 616) so that its zero-crossing sample resides precisely on zero. This point is used as a reference within the ECS calibration signal used for comparison with the actual condition ECS signal, as was explained above with regard to determining residue. The result after processing of the calibration data is a calibration data, windowed, and upsampled ECS signal with a known zero-crossing point that is used for determining the residue, as described by the description of FIG. 3.

Figure 11:
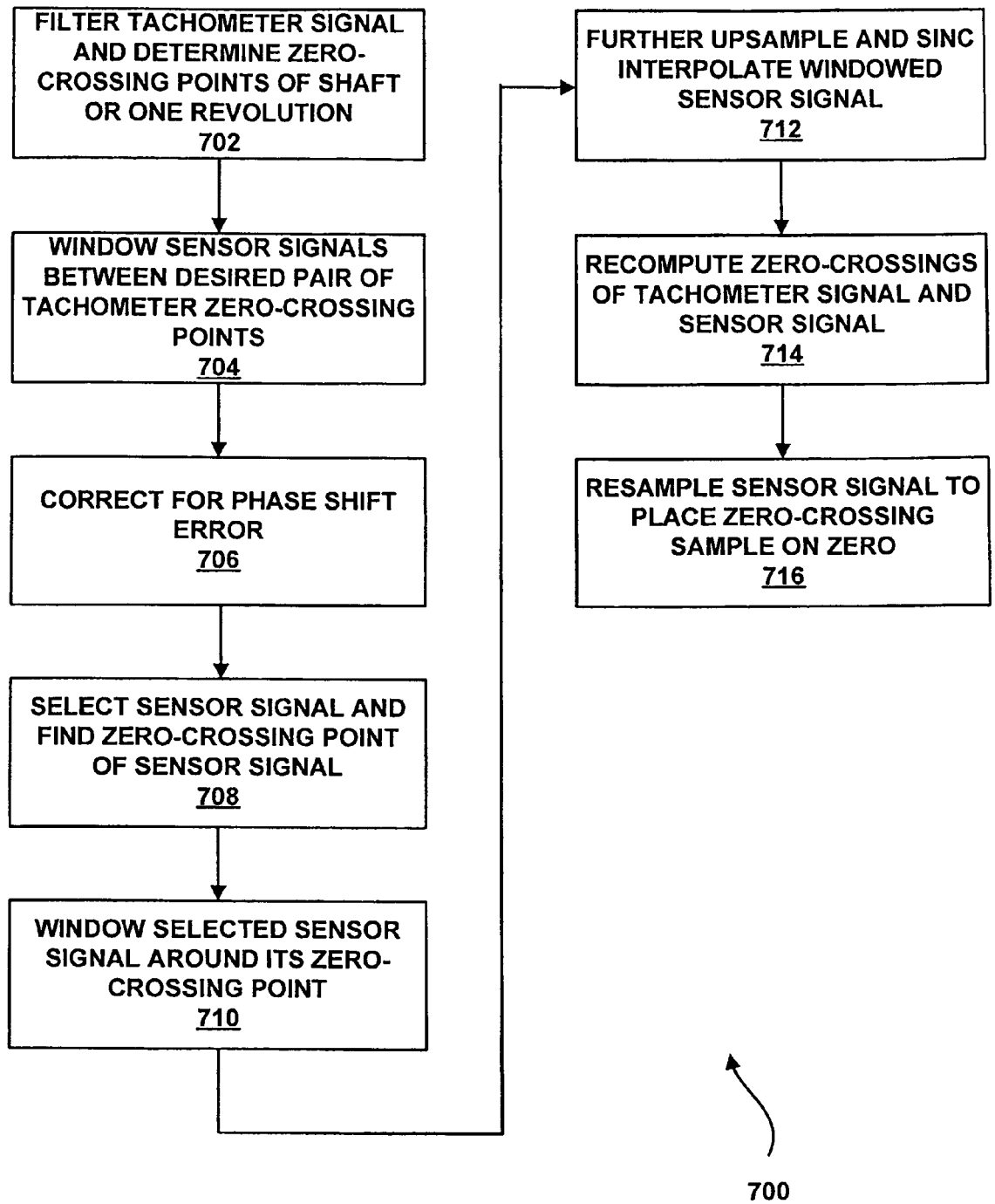
FIG. 11 is a flow chart further illustrating the functions performed during processing of the actual condition data.

FIG. 11 is a flow chart further illustrating the functions performed during processing of the actual condition data. Since the functions performed during processing of actual condition data are so similar to the functions performed during processing of calibration data, the functions are merely summarized herein. Specifically, as shown by the flow chart 700 of FIG. 11, with the turbine 350 being used in its normal environment, the tachometer signal is filtered and the zero-crossing points of the shaft are determined for one revolution of the shaft (block 702). ECS signals between a desired pair of tachometer 400 zero-crossing points are windowed (block 704). To correct for phase shift error, the ECS signals are then subsample shifted (block 706). A specific ECS pulse is then selected from the ECS pulses located between the desired pair of tachometer 400 zero-crossing points, after which a zero-crossing point(s) of the specific ECS pulse is determined (block 708).

As is shown by FIG. 11, the selected ECS signal is then windowed around its zero-crossing point (block 710). To obtain a zero-crossing point sample, or at least a more accurate measurement of the zero-crossing point, the windowed ECS signal (i.e., data channel) is then further upsampled and sinc interpolated (block 712). After upsampling and sinc interpolating, the zero crossings of the tachometer signal and the ECS signal are recomputed (block 714). The ECS signal is then resampled (block 716) so that its zero-crossing sample resides precisely on zero. The result after processing of the actual condition data is an actual condition data, windowed, and upsampled ECS pulse with a known zero-crossing point that is used for determining the residue, as described by the description of FIG. 3.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for providing blade vibration analysis of a turbine, wherein the turbine contains a series of blades, a rotor, and a shaft, the system comprising:
    a non-contacting sensor capable of determining a distance or velocity of a blade, of said series of blades, in relationship to said sensor, wherein said non-contacting sensor provides a non-contacting sensor signal;
    a tachometer capable of determining a speed of said shaft; and
    a computer comprising a memory and a processor, said processor configured by said memory to perform the steps of:
        processing calibration data of said turbine resulting in a processed calibration signal;
        processing actual condition data of said turbine, resulting in a processed actual condition signal;
        calculating a time dilation ratio between a calibration data tachometer window and an actual condition data tachometer window;
        time dilating either a calibration sensor signal or an actual condition sensor signal using said time dilation ratio, resulting in a time dilated sensor signal;
        rewindowing said time dilated sensor signal around a zero-crossing point of said time dilated sensor signal, resulting in a derived calibration or actual condition sensor signal; and
        subtracting said derived calibration or actual condition sensor signal from said processed calibration or actual condition signal.

2. The system of claim 1, wherein said processor is further configured by said memory to perform the step of resampling said time dilated sensor signal after said step of time dilating, so that a zero-crossing sample of said time dilated sensor signal resides precisely on zero.

3. The system of claim 1, wherein said non-contacting sensor signal is an eddy current signal and wherein said non-contacting sensor is an eddy current sensor.

4. The system of claim 1, wherein said sensor is a variable reluctance sensor.

5. The system of claim 1, further comprising a series of non-contacting sensors.

6. The system of claim 1, further comprising an amplifier/driver for amplifying/driving said non-contacting sensor.

7. The system of claim 1, wherein said step of processing calibration data, and said step of processing actual condition data further comprise the steps of:
    filtering a signal from said tachometer and determining zero-crossing points of said shaft for one revolution of said shaft;
    windowing sensor signals located between a desired pair of tachometer zero-crossing points;

selecting a sensor signal of said windowed sensor signals and finding a zero-crossing point of said selected sensor signal;

windowing said selected sensor signal around a zero-crossing point of said selected sensor signal; and upsampling and sinc interpolating said windowed sensor signal and said selected sensor signal.

8. The system of claim 7, wherein said step of processing calibration data, and said step of processing actual condition data, further comprise the step of recomputing zero crossings of said tachometer signal and said non-contacting sensor signal.

9. The system of claim 7, wherein said step of processing calibration data, and said step of processing actual condition data, further comprise the step of correcting for phase shift error after said step of windowing sensor signals located between a desired pair of tachometer zero-crossing points.

10. The system of claim 8, wherein said step of processing calibration data, and said step of processing actual condition data, further comprise the step of resampling said non-contacting sensor signal, resulting in a zero-crossing sample of said non-contacting sensor signal residing precisely at zero.

11. A method of providing blade vibration analysis of a turbine, wherein the turbine contains a series of blades, a rotor, and a shaft, the method comprising the steps of:

processing calibration data of said turbine resulting in a processed calibration signal;

processing actual condition data of said turbine, resulting in a processed actual condition signal;

calculating a time dilation ratio between a calibration data tachometer window and an actual condition data tachometer window;

time dilating either a calibration sensor signal or an actual condition sensor signal using said time dilation ratio, resulting in a time dilated sensor signal;

rewindowing said time dilated sensor signal around a zero-crossing point of said time dilated sensor signal, resulting in a derived calibration or actual condition sensor signal; and subtracting said derived calibration or actual condition sensor signal from said processed calibration or actual condition signal.

12. The method of claim 11, further comprising the step of resampling said time dilated sensor signal after said step of time dilating, so that a zero-crossing sample of said dilated sensor signal resides precisely on zero.

13. The method of claim 11, wherein said step of processing calibration data, and said step of processing actual condition data, further comprise the steps of:

filtering a signal from a tachometer and determining zero-crossing points of said shaft for one revolution of said shaft;

windowing sensor signals located between a desired pair of tachometer zero-crossing points;

selecting a sensor signal of said windowed sensor signals and finding a zero-crossing point of said selected sensor signal;

windowing said selected sensor signal around a zero-crossing point of said selected sensor signal; and upsampling and sine interpolating said windowed sensor signal and said selected sensor signal.

14. The method of claim 13, wherein said step of processing calibration data, and said step of processing actual condition data, further comprise the step of recomputing zero crossings of said tachometer signal and a non-contacting sensor signal of a non-contacting sensor that is capable of determining a distance or velocity of a blade, of said series of blades, in relationship to said non-contacting sensor.

15. The method of claim 13, wherein said step of processing calibration data, and said step of processing actual condition data, further comprise the step of correcting for phase shift error after said step of windowing sensor signals located between a desired pair of tachometer zero-crossing points.

16. The method of claim 14, wherein said step of processing calibration data, and said step of processing actual condition data, further comprise the step of resampling a non-contacting sensor signal of a non-contacting sensor that is capable of determining a distance or velocity of a blade, of said series of blades, in relationship to said non-contacting sensor, resulting in a zero-crossing sample of said non-contacting sensor signal residing precisely at zero.

17. A system for providing blade vibration analysis of a turbine, wherein the turbine contains a series of blades, a rotor, and a shaft, the system comprising:

a non-contacting sensor capable of determining a distance or velocity of a blade, of said series of blades, in relationship to said sensor;

a tachometer capable of determining a speed of said shaft;

logic configured to process calibration data of said turbine resulting in a processed calibration signal;

logic configured to process actual condition data of said turbine, resulting in a processed actual condition signal;

logic configured to calculate a time dilation ratio between a calibration data tachometer window and an actual condition data tachometer window;

logic configured to time dilate either a calibration sensor signal or an actual condition sensor signal using said time dilation ratio, resulting in a time dilated sensor signal;

logic configured to rewindow said time dilated sensor signal around a zero-crossing point of said time dilated sensor signal, resulting in a derived calibration or actual condition sensor signal; and logic configured to subtract said derived calibration or actual condition sensor signal from said processed calibration or actual condition signal.

18. The system of claim 17, further comprising logic configured to resample said time dilated sensor signal, so that a zero-crossing sample of said time dilated sensor signal resides precisely on zero.

* * * * *